United States Patent
Confer

[15] 3,704,031
[45] Nov. 28, 1972

[54] PROTECTION APPARATUS FOR A VEHICLE

[72] Inventor: Howard F. Confer, 116 Chesterfield, Bloomfield Hills, Mich. 48013

[22] Filed: April 16, 1970

[21] Appl. No.: 29,027

[52] U.S. Cl. ............................280/150 C, 180/5 R
[51] Int. Cl. ............................................B60r 19/00
[58] Field of Search ........... 280/150 R, 150 C, 150 F; 296/102; 30/233

[56] References Cited

UNITED STATES PATENTS

| | | | |
|---|---|---|---|
| 3,552,514 | 1/1971 | Alpers | 280/150 C |
| 1,122,742 | 12/1914 | Halbach | 280/150 R |
| 2,529,998 | 11/1950 | Burke | 280/150 R |

*Primary Examiner*—Benjamin Hersh
*Assistant Examiner*—Robert R. Song
*Attorney*—Irving M. Weiner

[57] ABSTRACT

A combined safety bumper guard and cutter elements for a vehicle, such as a snowmobile. A frame consisting of square cross sectioned structural elements is removably mounted on the snowmobile. The frame includes two U-shaped members whose legs are rigidly affixed to each other, and whose central portions are spanned by two substantially oblique structural members each of which has a hardened steel cutter element mounted thereon for cutting or severing wires or other obstacles encountered by the snowmobile when in motion.

7 Claims, 7 Drawing Figures

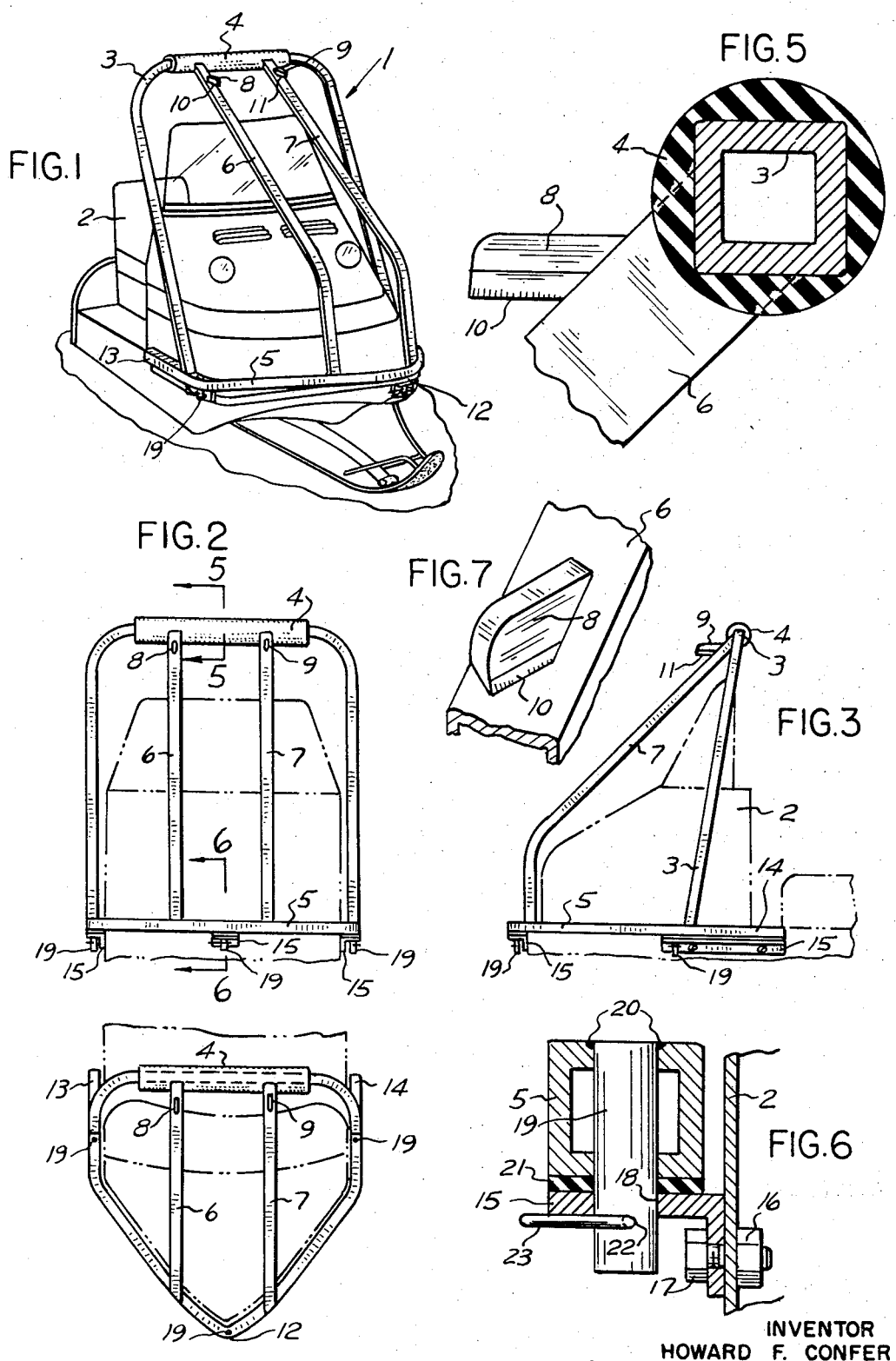

PROTECTION APPARATUS FOR A VEHICLE

The present invention relates to a protection apparatus for use in conjunction with a vehicle. In particular, the invention relates to a combined safety bumper guard apparatus with an obstacle-cutting device for use with snowmobiles.

Most conventional vehicles, such as snowmobiles, are manufactured and sold to the public without sufficient bumper guard protection, and as a result the slightest impact with any obstacle invariably causes great damage to the vehicle and its occupants. With the increased use of many different types of self-propelled vehicles which run on land, water, snow, ice, or in the air, there has been an alarming increase in the number of serious injuries to the drivers and other occupants of these vehicles. In particular, many occupants of snowmobiles have been seriously injured when the snowmobile in which they are riding encounters a wire fence or collides with a tree even at very low speeds. Invariably, the occupants of the snowmobile are seriously injured, and the relatively thin sheets of metal or fiberglass from which the body of the snowmobile are made receive extreme damages which are usually beyond repair.

Furthermore, many self-propelled vehicles, especially those which ride on snow or ice are subjected to various conditions of unbalance which cause the vehicle to tip over sideways with its occupants. This type of tipping over accident most frequently occurs while the vehicle is in motion. As a result, the occupants are invariably seriously injured and the side portions of the vehicle are damaged beyond repair.

The present invention solves the problems and disadvantages mentioned hereinabove with reference to conventional self-propelled vehicles.

SUMMARY

The present invention provides a protection apparatus for use in conjunction with a vehicle, comprising first means having at least a portion thereof disposed substantially transverse to the normal direction of motion of the vehicle. The apparatus also includes second means which is connected to the first means, and the second means is adapted to connect the protection apparatus to the vehicle. There is also included third means which are disposed between and connected to the first means and the second means. The apparatus also provides cutting means connected to the first means, to the second means, or to the third means for severing obstacles, such as wire fences, which may be encountered when such vehicle is in motion.

In a preferred embodiment, the present invention provides a protection apparatus for use in conjunction with a snowmobile. The apparatus is provided with first means which includes a substantially U-shaped structural member having a substantially square cross section. The first means also includes a portion which is disposed substantially transverse to the normal direction of motion of the snowmobile, and that portion includes a non-metallic bumper pad which is capable of absorbing an impact. The apparatus is also provided with second means which includes a substantially U-shaped structural member having a substantially square cross section. The second means also includes predetermined means for removably mounting the apparatus to the chassis of the snowmobile. The legs of the substantially U-shaped structural member of the first means are rigidly affixed to the legs of the substantially U-shaped structural member of the second means. There is also provided third means disposed between and connected to the first means and the second means. The third means includes a plurality of substantially parallel structural members each of which has a substantially square cross section. The surfaces of the first means and of the second means which are furthest from the vertical median plane of the snowmobile which is parallel to the normal direction of motion of the snowmobile have a substantially flat shape. The apparatus is also provided with cutting means including at least two cutter elements which are disposed substantially parallel to the normal direction of motion of the snowmobile. Each of the substantially parallel structural members of the third means has affixed thereto one of the cutter elements for severing obstacles which, such as wire fences, ropes or tree branches, may be encountered by the snowmobile when the snowmobile is in motion.

BRIEF DESCRIPTION OF THE DRAWING

FIG. 1 illustrates a perspective view of a first embodiment of the protection apparatus according to the present invention which is shown mounted on a conventional snowmobile.

FIG. 2 illustrates a front elevational view of the first embodiment of the invention which is depicted in FIG. 1.

FIG. 3 illustrates a side elevational view of the first embodiment of the present invention which is shown in FIGS. 1 and 2.

FIG. 4 illustrates a top plan view of the first embodiment of the present invention which is depicted in FIGS. 1, 2 and 3.

FIG. 5 illustrates an enlarged sectional view of the bumper pad and the structural member upon which it is mounted taken along the reference line 5—5 shown in FIG. 2.

FIG. 6 illustrates an enlarged view partly in section showing one of the means for removably mounting the protection apparatus onto the body of the snowmobile taken along the reference line 6—6 as depicted in FIG. 2.

FIG. 7 illustrates an enlarged perspective view of one of the hardened steel cutter elements which are rigidly affixed to certain of the front structural members of the protection apparatus according to the present invention.

DETAILED DESCRIPTION OF SOME PREFERRED EMBODIMENTS

With reference to FIGS. 1, 2, 3 and 4, there is illustrated a first embodiment of the present invention in the form of a protection apparatus 1 which may be readily and removably mounted on a snowmobile 2. In this embodiment, the protection apparatus 1 includes first means, such as a substantially U-shaped structural member 3, which has its uppermost portion disposed substantially transverse to the normal direction of motion of the snowmobile 2. The uppermost portion of the structural member 3 may be provided with an impact-absorbing bumper pad 4 which is shown in greater detail in FIG. 5.

THe protection apparatus 1 is also provided with second means which includes a substantially U-shaped structural member 5 which may have the ends of its legs rigidly affixed, for example, by welding, to the ends of the legs of the structural member 3. Preferably, the member 5 extends rearwardly and laterally proximate the lower portion of the vehicle. The structural member 5 is disposed in a substantially horizontal plane and, as best illustrated in FIGS. 3 and 4, would normally be the first portion of the protection apparatus 1 which would contact an obstacle into which the snowmobile 1 may be driven. It is therefore necessary for the structural member 5, as well as the other structural members of the protection apparatus 1, to possess sufficient strength and impact resistance to withstand any accidental encounter of the snowmobile 1 with an obstacle and to prevent the snowmobile 2 proper from being damaged. A vital feature of the present invention resides in the type of structural member which is employed in the protection apparatus 1 in order to fulfill the strength and impact resistance requirements mentioned hereinabove. A preferred type of structural member for use in the present invention would be fabricated from structural steel which has a substantially square cross section. This is shown most clearly in FIG. 5.

The type of structural member, its cross section, fitness and material will depend several variables, such as the size of the vehicle with which it is intended to be used, the mode of power of the vehicle, the greatest speed of the vehicle, etc. For some types of conventional snowmobiles, it has been found that structural members fabricated from one inch square cross sectioned structural steel which is about ¼ of an inch thick may afford more than adequate protection for the snowmobile 2 and its occupants.

Referring again to FIGS. 1, 2, 3 and 4, the protection apparatus 1 is provided with third means, such as plurality of substantially parallel structural members 6 and 7, which are disposed between and connected to the structural member 3 and the structural member 5. It has also been found preferable to construct the structural members 6 and 7 from structural steel having a substantially square cross section.

The novel protection apparatus 1 is also provided with cutting means which include at least two cutter elements 8 and 9 which have a hard knife-like edge 10 and 11, respectively, on the bottom side thereof. The cutter elements 8 and 9 are rigidly affixed, for example, by welding, to the surface of the structural members 6 and 7, respectively, on that portion thereof which is sloping or disposed substantially oblique to the normal direction of motion of the snowmobile 2. This particular placement of the cutter elements 8 and 9 constitutes a vital feature of the present invention. When the snowmobile 2 or other vehicle upon which the protection apparatus 1 is mounted runs into or under an obstacle, such as a wire fence, the wire will slide up the sloping surfaces of the structural members 6 and 7 until it encounters the knife-like edges 10 and 11, respectively, which cut or snap the wire. In this manner, grave injuries to the driver and other occupants or the snowmobile 2 are avoided.

It is also important to note that the placement of the structural members 6 and 7 and the affixed cutter elements 8 and 9 is such that interference with the vision of the driver and occupants of the snowmobile 2 is kept at a minimum.

With particular reference to FIG. 5, there is shown an impact-absorbing element or bumper pad 4 which may be made of various non-metallic materials such as rubber. The bumper pad 4 has a cylindrical outer periphery, and the bumper pad itself is mounted upon the square cross sectioned structural member 3. The bumper pad 4 may be made of a molded rubber of polyurethane material with a cylindrical outer periphery and a square cross sectioned interior aperture for fitting on the structural member 3. With reference to FIGS. 1, 2 and 4, it will be observed that the uppermost ends of the structural members 6 and 7 assist materially in preventing any lateral displacement or movement of the bumper pad 4 along the structural member 3 upon which it is mounted. The bumper pad 4 is provided to minimize or completely eliminate possible injuries to the driver or other occupants of the snowmobile 2. The bumper pad 4 is especially useful should the head of the driver be thrown forward when the snowmobile 2 strikes an obstacle such as a tree or rock.

Another very important feature of the present invention relates to the frequent problem of a tipping over of the snowmobile 2 in a sideways direction. Invariably, such a tipping over in a sideways direction occurs when the snowmobile 2 is in motion.

Because of the square or rectangular cross section of the structural members, the surfaces of the structural members which are furthest from a vertical median plane parallel to the normal direction of motion of the snowmobile 2 has a substantially flat shape. The flat outer surface of the square shape structural members, such as members 3 and 5, become vital and come into play during such a tipping over when these flat outer surfaces act as a runner or skid for the vehicle while it is in motion but tipped over sideways. This feature also adds materially to the damage and injury prevention aspects of the present invention.

The dimensions of the protection apparatus 1, and particularily of the structural member 3, are carefully controlled variables for making the present invention eminently suitable for use in conjunction with any vehicle, especially a snowmobile. In particular, the bumper pad 4 is positioned so as to be level when the top of the head of the driver of the snowmobile 2 in order to increase the chances of the head of the driver striking the impact absorbing bumper pad 4 in an accident, rather than any other element on the snowmobile 2 or protection apparatus 1. The transverse portion of the structural element 3 with its affixed bumper pad 4 does not interfere with the line of vision of the driver of the snowmobile 2.

It has been found that the damages and injuries to a snowmobile 2 or occupants are severely increased when the snowmobile tips over sideways because the vehicle will invariably keep tipping over or turn completely over and thus, gravely injure the occupants. The present invention eliminates this problem of a complete turnover of the snowmobile 2 by providing a sufficiently high enough substantially vertical member, such as structural member 3, which makes it virtually impossible for the snowmobile 2 to turn completely over when the structural member 3 makes contact with the ground. Furthermore, this tipping over or unbalance condition of snowmobiles invariably occurs when the snowmobile is in motion. The relatively high dimension of the structural member 3 together with the flat outer surfaces of the structural members 3 and 5 permit the snowmobile 2 to skid along the ground for many yards before it comes to rest without the danger of the snowmobile 2 tipping completely over.

It is also important to note that the protection apparatus 1 according to the present invention provides a type of cradle or basket protecting the various parts on the conventional snowmobile. conventional snowmobiles are manufactured with materials, such as thin sheets of fiberglass or aluminum, which are relatively soft as compared to the structural members of the novel protection apparatus 1. The protection apparatus 1 not only prevents the portions of the snowmobile proper from being damaged, but also adds substantial strength and rigidity to the entire framework of the snowmobile 2.

With particular reference to the FIG. 4, it is shown that the square cross section structural member 5 is positioned so that its forwardmost part is in a position which would contact any obstacle encountered by the snowmobile 2 before any of the other parts of the protection apparatus 1 or of the snowmobile 2 itself. An important aspect of the present invention resides in the particular shape of the structural member 5. It has been found in practice to provide the structural member 5 with a pointed nose 12 which tapers off on both sides to a curved structure so that the top plan view of the structural member 5 appears to resemble a substantially Gothic arch shaped member. As an alternative or modification of the particular shape of structural member 5 illustrated in FIG. 4, the nose of the structural member 5 can be provided with a small radius of curvature. Either of these types of nose shapes is of considerable assistance when the snowmobile 2 should contact an obstacle, such as for example a tree. The rounded nose or the pointed nose 12, resembling the top of a Gothic arch, helps to push the snowmobile or the encountered obstacle to one side or the other, and thus minimizes, if not completely eliminates, the chances of having a fully solid impact with any encountered obstacle. In other words, the snowmobile 2 provided with the protection apparatus 1 will glance off of or veer off of a great variety of possible encountered obstacles.

It also essential that the protection apparatus 1 be relatively light and be capable of being mounted and removed from the snowmobile proper very quickly and easily without requiring more than one person and without the necessity of any tools whatsoever. The present invention meets these requirements, and indeed even a teenager can readily mount or remove the protection apparatus 1 from the snowmobile 2 within less than 30 seconds without the necessity of using any tools at all.

With reference to FIGS. 1, 3 and 4, it can be seen that the substantially horizontal square cross sectioned structural member 5 may be provided with leg portions 13 and 14 which extend further back from the welded junction of the structural member 3 with the structural member 5. These leg portions 13 and 14 add considerable strength and rigidity to the protection apparatus 1, and also augment the protective cradling arrangement of the apparatus. Because the conventional snowmobile 2 is invariably sold as original equipment with weak body and side members, it has been found advantageous to affix substantially L-shaped angle members 15 to the body or frame of the snowmobile 2 by means of nuts 16 and bolts 17, shown best in FIG. 6. This not only strengthens the snowmobile 2 itself, but provides ample mounting support for the protection apparatus 1. The angle members 15 can be left permanently affixed to the snowmobile 2. The substantially horizontal platform of the angle member 15 can be provided with an aperture 18 to accommodate a mounting pin 19 which is described in greater detail hereinafter.

As mentioned above, it is essential that the protection apparatus 1 be easily and readily mounted onto the snowmobile 2 with a minimum of effort and tools. These objectives are accomplished by a special mounting arrangement which is best illustrated in FIG. 6. The structural member 5 is provided with three mounting pins 19 which are welded to the structural member 5. An exemplary placement of the three mounting pins 19 is best seen in FIG. 4.

Referring again to FIG. 6, it is shown that the mounting pin 19 is mounted internally and substantially bisects the structural member 5, and may be welded at 20 near the upper surface of the structural member 5. A rubber washer 21 may be placed around the depending mounting pin 19, and between the lower surface of the square sectioned structural member 5 and the horizontal platform provided by the angle member 15. This rubber member eliminates any rattling between the protection apparatus 1 and the angle members 15, and at the same time provides shock absorbing means.

The depending mounting pins 19 are inserted in the apertures 18 within the angle members 15. The portion of the depending mounting pin 19 which is below the horizontal platform of the angle member 15 is provided with a small horizontally-directed hole 22. A readily removable hitch pin clip 23, which functions like a cotter pin, may be readily and quickly inserted through the horizontal hole 22 to ensure that the mounting pin 19 remains in its proper position.

I claim:

1. A protection apparatus for use in conjunction with a vehicle, comprising, in combination:

generally U-shaped first means having upwardly extending legs each disposed on an opposite side of said vehicle, and a cross portion extending substantially transverse to the normal direction of motion of said vehicle between the uppermost ends of said upwardly extending legs;

said first means includes a first structural element which has a substantially square cross section;

generally U-shaped second means disposed in a substantially horizontal plane of said vehicle such that the legs of the U-shape extend substantially rearwardly and laterally proximate the lower portion of the vehicle and the cross portion of the U-shape extends across the front of said vehicle so that the forwardmost part of said second means is in a position which would contact any obstacle encountered by said vehicle before any of the other components of said protective apparatus and said vehicle;

said second means includes a second structural element which has a substantially square cross section;

the legs of said generally U-shaped first means being rigidly affixed to the legs of said generally U-shaped second means;

said extensions of the legs of said second means afford added protection to the sides of said vehicle without presenting an obstacle to the driver and passenger in entering or exiting from said vehicle;

third means disposed between and connected to said first and said second means;

said third means including a plurality of substantially parallel spaced apart third structural members each of which has substantially square cross section;

the surfaces of said first means and of said second means which are disposed at the furthest distance from the vertical median plane of said vehicle parallel to the normal direction of motion of said vehicle have a substantially flat surface; and cutting means integrally and non-movably affixed to each of said third means for severing obstacles which may be encountered by said vehicle when said vehicle is in motion.

2. A protection apparatus characterized in accordance with claim 1, wherein said third means includes at least a portion thereof which is disposed substantially oblique to said normal direction of motion of said vehicle, and said cutting means is connected to said portion of said third means which is disposed substantially oblique to said normal direction of motion of said vehicle.

3. A protection apparatus characterized in accordance with claim 2, wherein said first means, said second means and said third means form a cradle-like structure for protecting said vehicle and its occupants; said first means of said cradle-like structure being sufficiently high relative to the center of gravity of said vehicle to minimize the likelihood of said vehicle tipping over substantially more than 90° during an accident or imbalance condition; and the forwardmost portion of said second means of said cradle-like structure being provided with a substantially small radius of curvature to facilitate veering off of any obstacle which may be encountered when said vehicle is in motion.

4. A protection apparatus characterized in accordance with claim 1, wherein:

said first, second and third means form a structure laterally trapezoidal in profile and said second means consists of one and only one structural element having a non-circular cross section and extending below the lower ends of said first and second means.

5. A protection apparatus as defined in claim 1, including means for removably mounting said protection apparatus to said vehicle, comprising:

at least three brackets, a different one positioned and affixed on each side of said vehicle and a third positioned at the front of said vehicle in the substantially horizontal plane of said vehicle which contains the most outward protruding portions of said vehicle;

means defining a hole in each of said brackets, the longitudinal axis of each of said holes being substantially perpendicular to said horizontal plane of said vehicle;

at least three depending pins affixed to said third means, each adapted to be received in a different one of said holes in one of said brackets and being of such a length as to extend completely through and below said brackets;

means defining at least one horizontally-directed hole in each of said pins in that portion thereof which extends below said brackets; and at least three hitch pins, each adapted to be removably received in a different one of said horizontally-directed holes in said depending pins.

6. A protection apparatus for use in conjunction with a vehicle which includes a frame, a cowl mounted on the forward end of said frame, and an occupant section immediately to the rear of said cowl, comprising, in combination:

generally U-shaped first means having upwardly extending legs, each of said legs being positioned on opposite sides of said cowl at the rearwardmost edge of said cowl, and a cross portion disposed substantially transverse to the normal direction of motion of said vehicle between the uppermost ends of said legs over the top of said cowl;

said first means includes a first structural element which has a substantially square cross section;

a non-metallic energy absorbing pad disposed on said transverse portion of said first means to absorb the energy of impact by the driver and passenger of said vehicle with said transverse portion of said first means in the event the driver or passenger of said vehicle is projected upward when said vehicle encounters an unyielding obstacle;

generally U-shaped second means disposed in a substantially horizontal plane of said vehicle such that the legs of the U-shape extend rearward and the cross portion of the U-shape extends across the front of said vehicle so that the forwardmost part of said second means is in a position which would contact any obstacle encountered by said vehicle before any of the other components of said protection apparatus and said vehicle;

the extreme lower ends of said upwardly extending legs of said first means are integrally affixed and rigidly secured to said rearwardly extending legs of said second means forwardly of the rear end of said cowl;

said second means includes a second structural element which has a substantially square cross section;

the legs of said generally U-shaped second means extend substantially horizontally rearward past the junction of the extreme lower ends of the legs of said first means with the legs of said substantially U-shaped second means and rearward past the rear end of said cowl, said extensions of the legs of said second means afford added protection to the sides of said vehicle without presenting an obstacle to the driver and passenger in entering or exiting from said vehicle;

third means disposed between and connected to said first means and said second means;

said third means including a plurality of substantially parallel spaced apart third structural members each of which has a substantially square cross section and each of which has a substantially vertical portion and an oblique portion, said third means being secured to said second means rearwardly of the forward surface of said second means;

said first, second and third means forming a structure laterally trapezoidal in profile;

at least those surfaces of said protection apparatus which are disposed at the furthest distance from the vertical median plane of said vehicle have a substantially flat shape; and cutting means integrally and non-movably affixed to each of said third means for severing obstacles which may be encountered by said vehicle when said vehicle is in motion.

7. A protection apparatus as defined in claim 6, including means for removably mounting said protection apparatus to said vehicle, comprising:

at least three brackets, a different one positioned and affixed on each side of said vehicle and a third positioned at the front of said vehicle in the substantially horizontal plane of said vehicle which contains the most outward protruding portions of said vehicle;

means defining a hole in each of said brackets, the longitudinal axis of each of said holes being substantially perpendicular to said horizontal plane of said vehicle;

at least three depending pins affixed to said third means, each adapted to be received in a different one of said holes in one of said brackets and being of such a length as to extend completely through and below said brackets;

means defining at least one horizontally-directed hole in each of said pins in that portion thereof which extends below said brackets; and at least three hitch pins, each adapted to be removably received in a different one of said horizontally-directed holes in said depending pins.

* * * * *